H. SUTRO.

Cards for Wrapping Thread.

No. 5,725. Reissued Jan. 6, 1874.

Witnesses.

Wm. Busey

Ben. F. Clark.

Inventor.

Hugo Sutro

By J. P. Dietz

Atty.

AM. PHOTO-LITHOGRAPHIC Co. N.Y. (OSBORNE'S PROCESS)

UNITED STATES PATENT OFFICE.

HUGO SUTRO, OF NEW YORK, N. Y.

IMPROVEMENT IN CARDS FOR WRAPPING THREAD.

Specification forming part of Letters Patent No. 130,672, dated August 20, 1872; reissue No. 5,725, dated January 6, 1874; application filed December 15, 1873.

*To all whom it may concern:*

Figure 1:
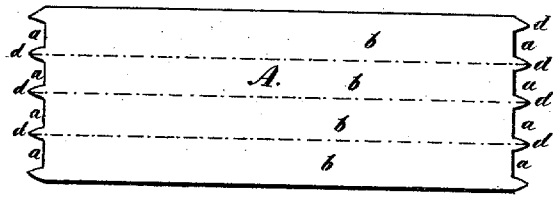
Figure 2:
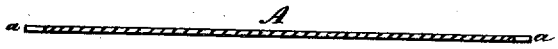

Be it known that I, HUGO SUTRO, of the city, county, and State of New York, have invented a new and Improved Device for Holding Braided and other Threads, of which the following is a specification:

Figure 1 represents a face view of my improved device for holding thread, braid, &c. Fig. 2 is a longitudinal section of the same.

Similar letters of reference indicate corresponding parts.

This invention relates to a new form for holding braided or other threads; and consists in notching a card at the ends to produce visible and accurate subdivisions of the skeins wound thereon, and perforating, partially cutting, or otherwise weakening the cord along a line between the said subdivisions. This is for the purpose of keeping the skeins so fully separated that they cannot become entangled, and that they can, each skein containing a certain length of thread, be cut apart with their sections of card, to furnish a desired measure of thread or braid.

A in the drawing represents the card or form around which the braided or plain thread, cord, or tape is wound lengthwise. The ends of this card are notched, as at *a a* in Fig. 1, there being as many notches as there are to be skeins or separate subdivisions wound about the card. In this manner the card is subdivided into a series of narrow sections, *b b*, all containing equal quantities of the fabric, the projecting prongs *d d* between the recesses *a* keeping the several skeins properly separated. The card is perforated, partially cut through, or otherwise weakened, lengthwise along a line or lines (indicated by the dotted lines in Fig. 1 of the drawings) to allow convenient detachment of any one or more of the sections *b* with cord on it, so that in retail trade the skeins can be disposed of separately without requiring their unwinding and special measurement.

The skeins on the card may be wound upon the sections *b*, so as to constitute one continuous thread, cord, or tape; or they may be independent of each other—*i. e.*, separate pieces—on the several sections *b*.

Thus put up on my card, the fabric, which may consist of woven, braided, or twisted cord, tape, ribbon, braid, or thread, cannot tangle nor soil, neither in the hands of the actual consumer, merchant, or manufacturer.

Under the old style of putting up such goods, they were very apt to become entangled, and, as they had to be separately measured in dealing out certain lengths, their delicate tints were often soiled, or they were twisted out of shape.

Having thus described my invention, I claim as new and desire to secure by Letters Patent—

The device for holding thread, consisting of a card or form, A, notched at the ends, and perforated or otherwise weakened lengthwise, so as to be divided into sections *b b*, as set forth.

HUGO SUTRO.

Witnesses:
EDWD. ARNOLD,
S. WALDO BANNING.